Jan. 13, 1970     I. A. MacKINNON     3,489,320

DEVICE FOR SPREADING LIQUID MANURE

Filed July 5, 1966     3 Sheets-Sheet 1

INVENTOR
IAN ARCHIE MacKINNON
BY
Mason, Mason & Albright
Attorneys

Jan. 13, 1970  I. A. MacKINNON  3,489,320
DEVICE FOR SPREADING LIQUID MANURE
Filed July 5, 1966  3 Sheets-Sheet 2
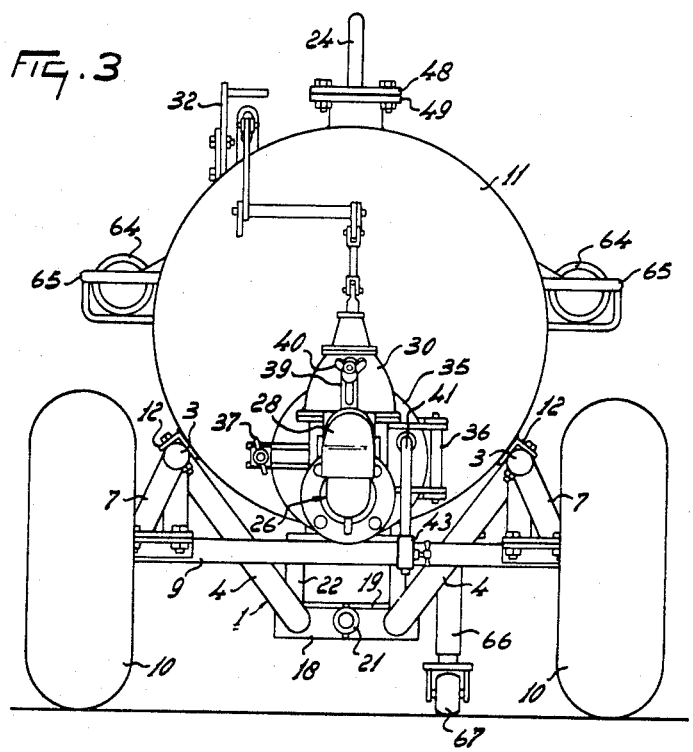
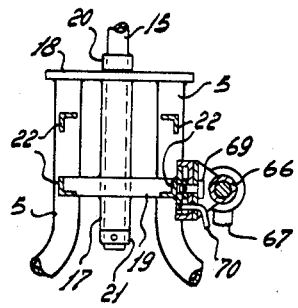
INVENTOR
IAN ARCHIE MacKINNON
BY
Mason, Mason & Albright
Attorneys United States Patent Office 3,489,320
Patented Jan. 13, 1970

3,489,320
DEVICE FOR SPREADING LIQUID MANURE
Ian Archie MacKinnon, Streetsville, Ontario, Canada, assignor to Lely Ltd., Burlington, Ontario, Canada
Filed July 5, 1966, Ser. No. 562,618
Claims priority, application Canada, May 16, 1966, 960,462
Int. Cl. B67d 5/38, 5/64
U.S. Cl. 222—156                    11 Claims

ABSTRACT OF THE DISCLOSURE

A spreading device has a container mounted on a frame having supporting frame beams. The container has a discharge opening at one end thereof with an adjustable valve and a distributor for discharging liquids in selected directions. The frame beams have several parts for supporting the container.

---

The invention relates to a device for spreading liquid manure, dredgings and similar viscous liquids. The aim of the invention is to provide a device with a strong and simple frame.

According to the invention the device for spreading liquid manure, dredgings and similar viscous liquids comprises a container for said liquid, a discharge opening in said container and a distributor communicating with said container, a frame for carrying said container, said frame comprising two frame beams each being located at different sides of a vertical plane comprising the longitudinal axis of said container, each of said frame beams having a first part bearing the container, said frame beams each extending forwardly with regard to the intended direction of travel of the device and having a second part extending downwards adjoining the first mentioned part and having third parts extending forwardly with respect to the intended direction of travel and adjoining the second parts, the third parts being connected to one another and being provided with coupling means with which the device can be coupled to a tractor or like propelling vehicle.

According to another object of the invention the device for spreading liquid manure is provided with an adjustable support.

According to the invention the device for spreading liquid manure, dredgings and similar viscous liquids, comprising a frame and a container, a discharge opening in said container and a distributor communicating with said container, a frame for carrying said container, said frame being provided with running wheels, a coupling member for coupling said device to a tractor or similar propelling vehicle, said coupling member being connected to the forward end of said frame viewed in the intended direction of movement of the device, said coupling member being pivotably mounted on said frame about an axis lying in the direction of travel so as to be pivotable about said axis during operation of the device.

According to another object of the invention the device is provided with means to observe the level of the liquid manure in the container.

According to the invention the device for spreading liquid manure, dredgings and similar viscous liquids, comprising a frame and a container, a discharge opening in said container and a distributor for spreading said liquid communicating with said container, a frame for carrying said container, said frame being provided with running wheels, an adjustable valve interposed between said container, a pump being connected with said container to suck liquid into said container through an opening destined by said valve, a window in a side wall of said container, said window being hingeably connected to said wall, locking means for locking said window against said wall.

According to another object of the invention the device is provided with a liquid trap to prevent liquid manure to enter into the pump of the device.

According to the invention the device for spreading liquid manure, dredgings and similar viscous liquids, comprising a container for said liquid, a discharge opening in said container, an adjustable valve means interposed between said container and a distributor to open and close said discharge opening, a pump, said pump being connected with said container to suck in through said discharge opening the liquid into said container, said pump being connected through a pipe with said container, said pipe being connected to the upper side of said container and being connected to the container with liquid trap means interposed between said pipe and said container, said liquid trap means comprising a vessel connected to the upper side of said container and extending into said container, said vessel having an inlet opening, one or more apertures being provided near the bottom of said vessel, a fastening member, said fastening member surrounding part of said pipe, a second vessel, said second vessel being arranged around said part of said pipe and to said first vessel, said second vessel being connected to said fastening member, a space between said second vessel and said fastening member, openings being provided to connect the space between said vessels with said pipe.

According to another object of the invention the device is provided with means by which liquid or air can be removed from the container through an auxiliary outlet pipe for cleaning purposes or for inducing tubulence into the manure present in a pit.

According to the invention the device for spreading liquid manure, dredgings and similar viscous liquids, comprising a container for said liquid, a discharge opening in said container, adjustable valve means interposed between said container, and a distributor to open and close said discharge opening, a pump provided on said device, said pump being connected with said container to suck out pump being connected with said container, an auxiliary outlet pipe connected to said container and valve means in said auxiliary outlet pipe for closing respectively opening said outlet pipe, a flexible tube connected to said auxiliary outlet pipe whereby air or liquid can be pumped out of said container through said auxiliary outlet pipe.

For a better understanding of the invention and to show how the same may be carried into effect, reference is made by way of example to the drawing, which shows a few embodiments.

FIG. 3 is a rear view of the device on an enlarged scale.

FIG. 4 is a top view according to line IV—IV in FIG. 2 of the frame on an enlarged scale.

Figures 1, 2:
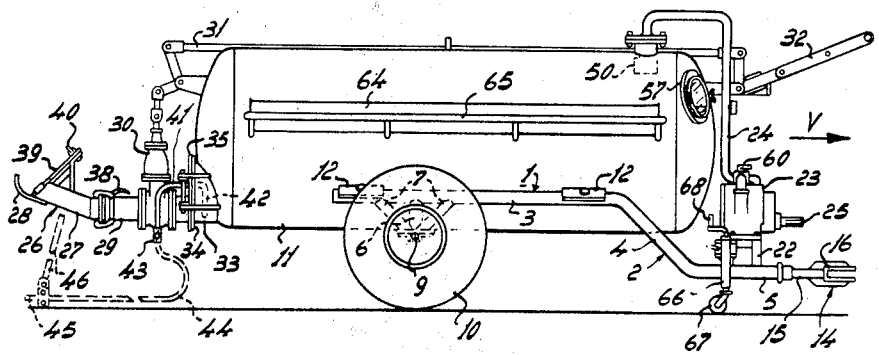
FIG. 1 is a side elevation of the device.
FIG. 2 is a front view of the device on an enlarged scale.
Figure 5:
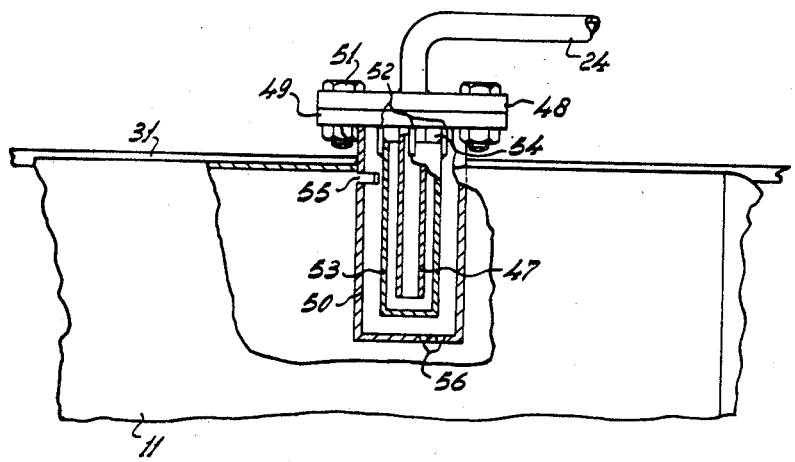
FIG. 5 is a section through a liquid trap on an enlarged scale.

The implement shown in FIGURES 1–5 is provided with a frame 1 comprising two frame beams 2 arranged side by side and at opposite side of a vertical plane AA extending into the direction of travel V of the implement. The frame beams 2 are each over a part 3 of their length substantially horizontal and viewed into the direction of travel V of the implement substantially parallel to one another. Each of the frame beams 2 are further provided with a downwardly extending part 4, these parts 4 converge viewed both from the rear of the implement and from above. Each of the frame beams 2 are further provided with a part 5, which joins the downwardly extending part 4, these parts 5 extend parallel to one another and substantially horizontal. The parts 3 of the frame beams 2 are near their rear ends provided with supports 6 extending substantially vertical (FIG. 2). These parts 3 are further provided with supports 7 which are in side elevation arranged at opposite sides of each of the supports 6 and which are extending downwardly and outwardly from the parts 3. A plate 8 extending in a horizontal plane is connected to the supports 6 and 7 and an axle 9, provided with ground wheels 10 having large pneumatic tires preferable of 14 inches, is connected to the plates 8. The implement is further provided with a cylindrical container 11 having at each of its side walls two angle irons 12. The container 11 is with the aid of these angle irons 12 and bolts 13 connected to the frame beams 2.

The frame 1 is at its front side provided with a draw arm 14 which comprises an axle 15 having at one end a fork 16. The axle 15 is pivotally arranged in the bushing 17 (FIG. 4) situated between the foremost parts 5 of the frame beams 2. The bushing 17 is with its front end connected to a strip 18 arranged between the parts 5 and at its rear end to a strip 19, which is also arranged between the parts 5.

At its front end the axle 15 is provided with a collar 20, whereas at its rear end a ring 21 is arranged which prevents movement of the axle 15 in its length direction.

On the parts 5 of the frame beams 2 a pump 23 (FIG. 1) is connected with the aid of supports 22. The pump 23 has a capacity of at least 1000 U.S. gallons/minute, is a high pressure pump having 35 pounds/square inch, pressure and 18½ inches of mercury vacuum, and is coupled to the container 11 through a pipe 24. The pump 23 can be driven in a known manner from the power take-off of a propelling tractor with the aid of an axle 25.

At the rear side of the container 11 there is provided a distributor 26 comprising an outlet spout 27 and a deflector 28. The spout 27 communicates with an outlet pipe 29 of the container 11. In the outlet pipe 29 an airtight valve 30 is arranged, which is coupled by means of a rod system 31 with an actuating arm 32 on the front side of the implement. On the rear side of the container 11 there is provided a cylindrical outlet channel 33 forming a discharge opening and having a diameter of 18 inches and being provided with a flange 34 at its rear end. Against the flange 34 a flange 35 is provided which can pivot about an axle 36 which is connected to the flange 34. The flange 34 is further provided with locking means 37 formed by a wing-nut with the aid of which the flange 35 can be clamped against the flange 34. The outlet pipe 29 is connected to the flange 35. The spout 27 with the deflector 28 is connected to the outlet pipe 29 with the aid of a quick release 38 which enables to change the position of the spout 27 with respect to the outlet pipe 29. For this purpose the spout 27 has a spherical part which is arranged into the corresponding spherical part of the outlet pipe 29. Both spherical parts are clamped together by the quick release 38. Due to this connection the spout 27 and deflector 28 can be adjusted both in upward direction and sideways. At the end of the spout 27 there is provided a slide valve 39, the slide of which is movable in guides. At the upper side of the slide valve 39 a wing-nut 40 is arranged, by which the slide of the valve 39 can be fixed in a number of positions.

As is shown in FIGURE 3, to the flange 35 a pipe 41 is connected which forms a discharge pipe for the container and which extends beneath the container. As is shown in FIGURE 1, the end 42 of the pipe 41 extends into the outlet channel of the container near its bottom, whereas the pipe 41 is at its end, which projects outside the container 11, provided with a valve 43 to which a tube 44 may be coupled. This tube 44 may have a length which is approximately the same as the length of the container 11. At the end of the flexible tube 44 there is provided a pipe 45 which has a size of 1" or 2" diameter, which is mounted on a stick 46.

As is already mentioned above, the pump 23 is with the aid of a pipe 24 connected with the container 11. To this end the pipe 24 extends with its end 47 into the container 11 (see FIGURE 5). To the pipe 24 a flange 48 is welded. A second flange 49 is arranged around the tube 24 and to this second flange 49 a vessel 50 is connected. The flanges 49 and 48 are fastened to one another with the aid of bolts 51. The vessel 50 is welded to the wall of the container 11. With the aid of strips 52 a second vessel 53 is connected to the flange 49, thus, that between the upper rim of the vessel 53 and the flange 49 a space 54 is present. The vessel 50 is at its rear uppermost end near the top wall of the container 11 provided with a slit 55, whereas the bottom of the vessel 50 is provided with a number of openings 56. The vessel 50 has an outer diameter of 6" and a slit 55 of ½" x 5". The vessel 53 has an outer diameter of 2". On the front side of the implement the wall of the container 11 is provided with a window 57 which can be opened with the aid of two pivots 58 forming a substantially vertical hinge. The window 57 can be closed with the aid of a locking means 59. The implement can be coupled to the tractor with the draw arm 14, whereas the axle 25 of the pump may be coupled with power take-off of the tractor (not shown), so that the pump is driven via the axle 25. If the pump 23 is driven, the container 11 can, depending from the position of a cock 60 in the duct 24, be emptied or filled. The cock may connect either the pipe 61, the pipe 62 or the pipe 63 to the pipe 24. The pipe 61 is connected to the press side of the pump, whereas the pipe 62 is connected to the suction side of the pump via the pipe 63. It is possible to connect the pipe 24 with the atmospheric pressure. In order to fill the container with liquid manure the spout 27 may be removed from the implement and a suction-hose 64 with a diameter of preferably at least 6 inches may be connected to the outlet pipe 29 with the quick release 38. The spout 27 can be deposited in one of the stands 65 which are provided on either sides of the container 11. If the container 11 must be filled, the air is withdrawn by the pump 23 from the container through the slit 55 of the vessel 50 and through the space 54 between the rim of the vessel 53 and the flange 49 and through the duct 24. The airtight valve 30 enables the container 11 to be filled with liquid manure in a very short time. Thus, the operation of the pump and valve 30 can be monitored by an operator stationed near arm 32.

In this way one can prevent in a simple manner that liquid manure which is sucked into the container 11 would come via the duct 24 into the pump 23. Even if the liquid level in the container would reach the upper wall of the container 11, the way the liquid manure has to follow in order to reach the end of the tube 47 is such that practically no liquid manure can come into the pump. If any liquid would come into the vessel 50 it can be carried off through the aperture 56.

If the container 11 is filled with liquid manure the implement can be transported by the tractor to the land on which the liquid manure must be spread. The axle 15 of the drawbar 14 can during use of the implement pivot about a substantially horizontal axis extending into the direction of movement of the implement, in view of the fact that this axle 15 is pivotable arranged in the bushing 17, which is connected to the foremost part 5 of the frame beams 2.

With this construction it is possible to move the implement over an uneven field without getting too much stress in the hitch of the tractor. The implement can easily be transported over the field due to the large width of the tires.

Figure 6:
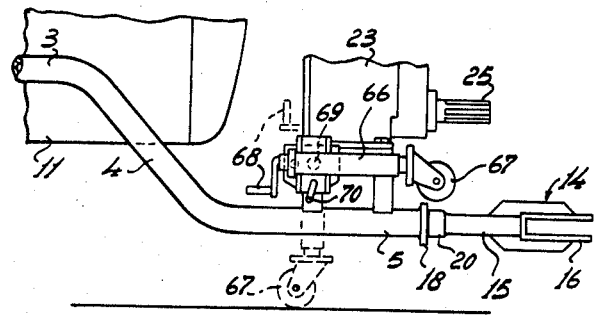
FIG. 6 is a side view of a front part of the frame on an enlarged scale.

On one of the supports 22 on which the pump 23 is mounted, there is provided a stud 66 having a supporting wheel 67 which is adjustable in vertical direction with the aid of screw spindle 68 which is pivotable with respect to the frame of the implement about a horizontal axle 69 (FIG. 6) which is transverse to the intended direction of movement of the implement whereas the screw spindle 68 and stud 66 can be fixed in a position in which the ground wheel is not in contact with the ground by a locking pin 70. This position is obtained by pivoting the screw spindle over about 90° around the axle 69. During use of the implement the ground wheel 67 is free from the ground. (FIG. 6 in dotted lines). If, however, the implement is not coupled to the tractor, it is possible to bring the ground wheel 67 in the position as shown in FIGURE 1 wherein this wheel 67 after fixing its position by the locking pin 70, supports the implement together with the ground wheels 10.

The liquid manure which is sucked into the container 11 can be spread over the field by pumping via the pump 23 air into the container 11. The liquid manure is spread under pressure via the spout 27 and the deflector 28. It is desirable to open the valve 30 completely. The amount of liquid manure spread out can be regulated by adjustment of the slide valve 38 which can be set in a number of positions with the wingnut 40.

As is already described, the implement is especially adapted to spread liquid manure or slurry. After filling the container via the outlet pipe 27 and before spreading the manure, it will be necessary to close the valve 43. The implement can also be used for spreading liquid such as water for cleaning purpose of the implement or other implements and for cleaning the walls of the pit, or for cleaning roads.

To this end the valve 43 and the tube 44 can be used. It is necessary to close the valve 30, so that the liquid present in the container 13 is spread via the pipe 41, the valve 43 and the tube 44 with its pipe 45.

It is also possible to use the pressurized air of the container 11 for agitating the slurry in the collecting tank or pit. This pressurized air is blown into the manure through the tube 44, this results in a turbulence and hence a mixing of the manure. This method is of interest before sucking the manure into the container 11. The pipe 45 is put into the pit with the aid of the stick 46 and the pressurized air of the container 11 is blown into the manure which is mixed. After throughly mixing of the manure it is easier to suck the manure into the container 11. If the manure must be sucked into the container the valve 43 is closed and the suction tube 64 is connected to the outlet pipe 29 with the aid of the quick release 38. The tube 44 which is not used, can be put in one of the stands 65. Due to the big size of the tube 64 it is possible to load the most difficult materials, such as trash or heavy lumps. The innerside of the container is preferably coated with tar to overcome corrosion.

What we claim is:

1. A device for spreading viscous liquids comprising a container for said liquid, a discharge opening in said container, adjustable valve means interposed between said container and a distributor to open and close said discharge opening, a pump connected with said container to suck the liquid in through said discharge opening into said container, said pump being connected through a conduit with said container, said conduit being connected to the upper side of said container and being further connected to a container with liquid trap means interposed between said conduit and said container, said liquid trap means comprising a first vessel connected to the upper side of said container and extending into said container, said first vessel having an inlet opening and at least one aperture adjacent the bottom thereof, flange means connecting said first vessel to said container, said flange means surrounding part of said conduit, a second vessel, said second vessel being within said first vessel and arranged to surround said part of the conduit, said second vessel being connected to said flange means, a space between said second vessel and said flange means comprising an opening at the top of said second vessel to connect said vessels with said conduit.

2. A device for spreading viscous liquids comprising a container for said liquid, a discharge opening in said container, an adjustable valve means interposed between said container and a distributor to open and close said discharge opening, a pump provided on said device, said pump being connected with said container to suck out air and to pump air into said container, a pipe connecting said pump and said container, said pipe being connected to the upper side of said container, liquid trap means interposed between said pipe and said container, an auxiliary outlet pipe provided on said container, valve means in said auxiliary outlet pipe for closing and opening said outlet pipe, said pipe having a part within said container and said part extending downwardly towards the bottom of said container, a flexible tube connected to said auxiliary outlet pipe whereby fluid can be pumped out of said container through said auxiliary outlet pipe.

3. A device for spreading viscous liquids comprising a frame mounted on wheels and a container supported on said frame, a discharge opening in said container and a distributor for spreading said liquid communicating with said opening, an adjustable valve located between said container and said distributor, a pump being connected to the front side of said container viewed in the normal direction of travel, said pump being positioned to suck liquid into said container through said opening, a window in the upper portion of the front wall of said container, said window being hingeably connected to said wall, locking means for locking said window against said wall, control means located adjacent said window between said front wall of the container and said adjustable valve, said control means extending to the rear wall of said container, said control means including an operable movable member positioned adjacent said front wall whereby the operation of said pump and valve can be monitored by an operator observing said window.

4. A device for spreading viscous liquids comprising a movable frame and a continer for said liquids supported on said frame, a discharge opening in the lower part of said container communicating with a distributor, adjustable valve means interposed between said container and said distributor to open and close said discharge opening, a pump supported on said device, said pump being connected with the interior of said container to suck out air and to pump air into said container, a vessel mounted on the upper portion of said container, a conduit connecting said vessel to said pump, said vessel having a bottom part with at least one aperture, control means in said conduit for preventing the liquid from entering into said conduit, an auxiliary outlet leading into said container above said opening and valve means in said auxiliary outlet for closing and opening same, said auxiliary outlet including a pipe having a part within said container, said part extending downwardly towards the bottom of said container.

5. A device as claimed in claim 4 wherein said auxiliary outlet pipe is connected to a container wall through flange means, said flange means including a fixed flange on said container and a movable flange connected to said pipe, said movable flange being pivotally associated with said fixed flange.

6. A device for spreading viscous liquids comprising a container for said liquid, a discharge opening at the rear side and lower part of said container, viewed relative to the direction of travel, adjustable valve means interposed between said container and said discharge opening, a distributor communicating with said opening to open and close same, a pump provided on the front end of said device, said pump being connected to said container to evacuate air and to pump air into said container, a conduit being in communication with said pump and said container, said conduit being connected to the upper side of said container and being further connected to a vessel with liquid control means interposed between said conduit and said container, an auxiliary outlet pipe connected to said rear side of said container above said opening, valve means in said auxiliary outlet pipe for closing and opening same, a flexible tube connected to said auxiliary outlet pipe whereby fluid can be pumped out of said container through said auxiliary pipe, said distributor being detachably connected to said discharge opening and being replaceable by a suction hose, a control being provided between said adjustable valve means and the front end of the device to manipulate the adjustable valve means from the front end of the device.

7. A device for spreading viscous liquids comprising a container for said liquid, a discharge opening in said container, an adjustable valve means interposed between said container and said opening, a distributor connected to said discharge opening, a pump mounted on said device, said pump being connected with said container to suck out air and to pump air into said container through a conduit connected to said pump and said container, said conduit being connected to the upper side of said container, a vessel with control means interposed between said conduit and said vessel to prevent liquid from entering said conduit, an auxiliary outlet pipe provided on said container, valve means in said auxiliary outlet pipe for closing and opening same, said auxiliary outlet including a pipe having a part within said container, said part extending downwardly towards the bottom of said container, a flexible tube connected to said auxiliary outlet pipe whereby fluid can be pumped out of said container through said auxiliary outlet pipe, said distributor being detachably connected to said discharge opening and replaceable by a suction hose.

8. A spreading device according to claim 7, wherein there is a frame for carrying said container, said frame having a frame beam located on each side of said container, each frame beam having a first part supporting said container, a second part extending downwardly and a third part extending forwardly, said second part connecting said first and said third parts, said third parts of said beams being joined to one another and having coupling means for coupling same to a prime mover.

9. A device as claimed in claim 8, wherein said coupling means comprises an axle supported by bearings positioned between the third parts of said frame beams.

10. A device as claimed in claim 7, wherein said pump has a vacuum of about 18 inches of mercury.

11. A device as claimed in claim 7, wherein said pump has a capacity of at least about 900 U.S. gallons/minute.

References Cited

UNITED STATES PATENTS

| | | | |
|---|---|---|---|
| 2,575,574 | 11/1951 | Withrow et al. | 137—251 |
| 2,975,978 | 3/1961 | Propst | 239—172 X |
| 2,981,552 | 4/1961 | Rutigliano | 280—150.5 |
| 3,340,890 | 9/1967 | Raskohodoff | 137—559 X |
| 2,056,828 | 10/1936 | Clawson | 222—156 X |
| 2,738,901 | 3/1956 | Swenson | 222—177 |
| 2,957,534 | 10/1960 | Burdette | 280—5 X |
| 3,040,785 | 6/1962 | Grindle | 222—176 X |
| 3,263,865 | 8/1966 | Kachnik | 280—5 X |

FOREIGN PATENTS

| | | |
|---|---|---|
| 131,557 | 8/1919 | Great Britain. |
| 813,512 | 5/1959 | Great Britain. |
| 722,617 | 1/1955 | Great Britain. |
| 744,780 | 2/1956 | Great Britain. |

ROBERT B. REEVES, Primary Examiner

H. S. LANE, Assistant Examiner

U.S. Cl. X.R.

222—178; 239—172; 280—5